United States Patent [19]

Bloome et al.

[11] Patent Number: 4,499,624
[45] Date of Patent: Feb. 19, 1985

[54] PORTABLE POLISHER

[75] Inventors: James A. Bloome, Blue Grass; Rick A. Meeker, Davenport; Jerry T. Whicker, Bettendorf; Frederick J. Foreman, Davenport, all of Iowa

[73] Assignee: The Kartridg Pak Company, Davenport, Iowa

[21] Appl. No.: 469,756

[22] Filed: Feb. 25, 1983

[51] Int. Cl.³ .......................... B64F 5/00; A47L 11/03
[52] U.S. Cl. .................... 15/97 R; 15/50 C; 15/98; 15/230
[58] Field of Search ................ 15/23, 24, 49 C, 50 C, 15/52, 98, 384, 97 R; 51/170 PT, 176

[56] References Cited

U.S. PATENT DOCUMENTS

| 1,061,843 | 5/1913 | Howarth . | |
|---|---|---|---|
| 1,846,163 | 2/1932 | Traver | 15/230 X |
| 1,849,218 | 3/1932 | Beach | 15/49 C |
| 2,120,252 | 6/1938 | Kadri . | |
| 2,186,397 | 1/1940 | Vickery . | |
| 2,354,307 | 7/1944 | Emery . | |
| 2,642,599 | 6/1953 | Habian | 15/24 |
| 2,842,788 | 7/1958 | Rench et al. | 15/49 C X |
| 3,061,859 | 11/1962 | Dubay | 15/50 C |
| 3,172,138 | 3/1965 | Price | 15/23 X |
| 3,395,495 | 8/1968 | Powanda . | |
| 3,619,948 | 11/1971 | Burns . | |
| 3,631,558 | 1/1972 | Kovacevic | 15/50 C |
| 4,302,122 | 11/1981 | Moya | 15/50 C |
| 4,328,645 | 5/1982 | Sauer . | |

FOREIGN PATENT DOCUMENTS

| 846333 | 8/1952 | Fed. Rep. of Germany | 15/49 C |
|---|---|---|---|
| 69660 | 6/1916 | Norway | 15/50 C |
| 193300 | 12/1937 | Switzerland | 15/24 |

Primary Examiner—Edward L. Roberts
Attorney, Agent, or Firm—Lockwood, Alex, Fitzgibbon & Cummings

[57] ABSTRACT

A portable polisher is provided for surface preparation or for surface repair of substrates such as sheet aluminum. The polisher is particularly well suited for restoring the polished finish of aluminum aircraft skin that has been dulled by normal use and to repair blemishes on polished aluminum that occur during handling and fabrication. This apparatus includes elongated polishing rolls that are driven by a motor in conjunction with a suitable counter-rotating drive arrangement such that one polishing roll rotates in a clockwise direction about its elongated axis and another polishing roll rotates in a counterclockwise direction about its elongated axis. The apparatus may also include features for counter-oscillating the polishing rolls about their respective longitudinal axes.

14 Claims, 13 Drawing Figures

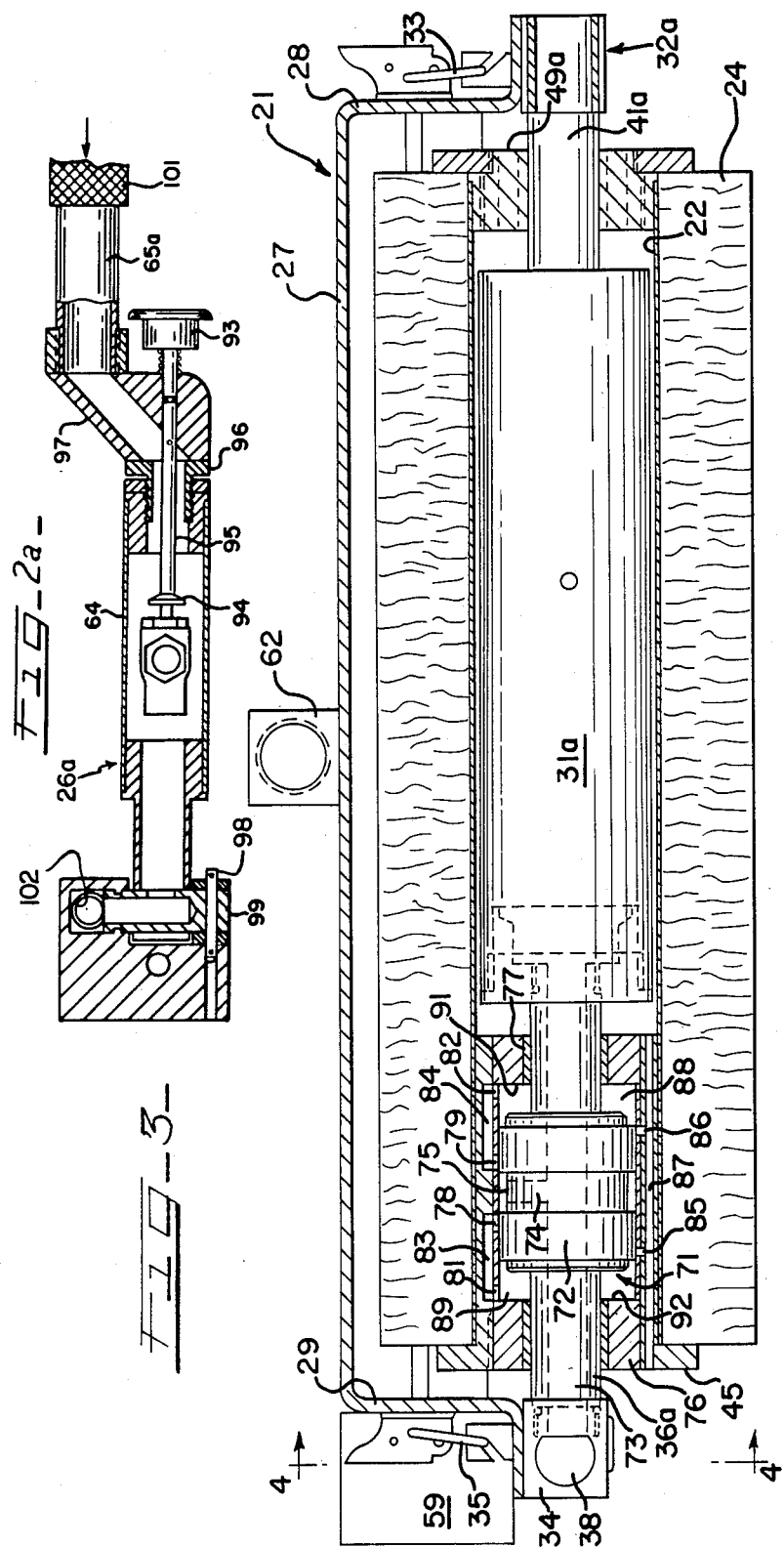

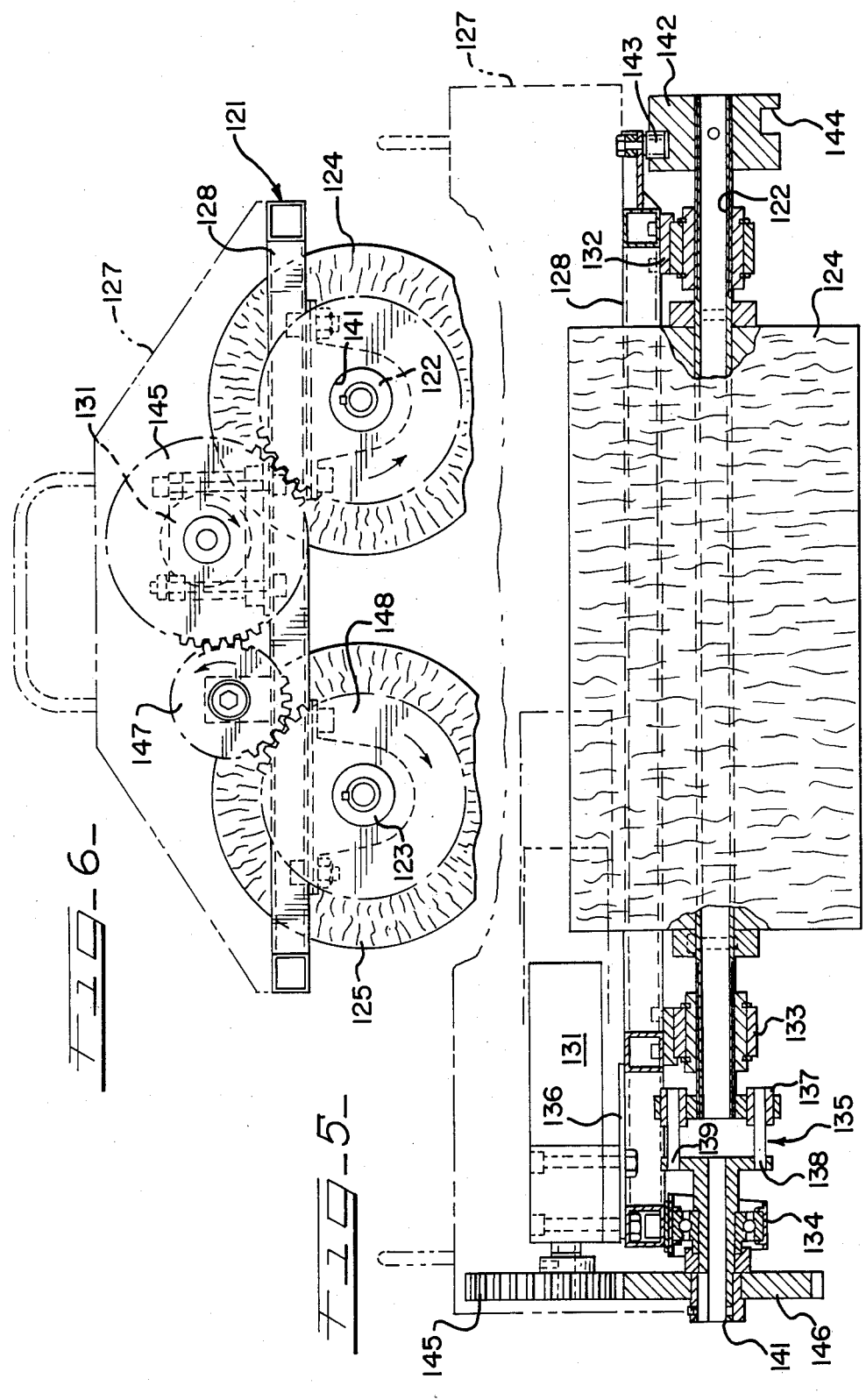

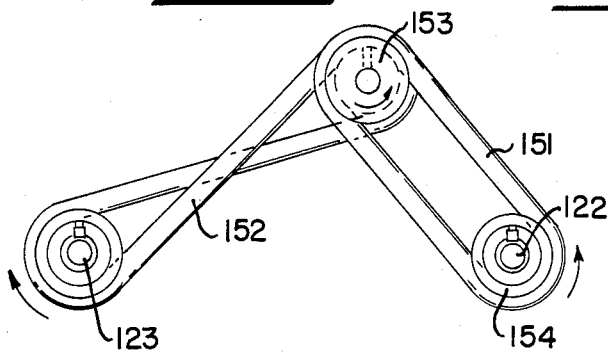
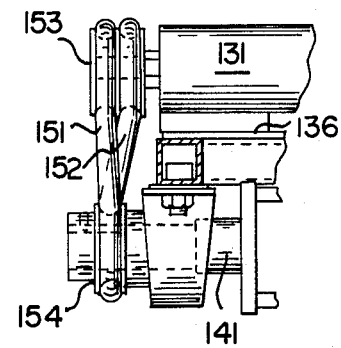
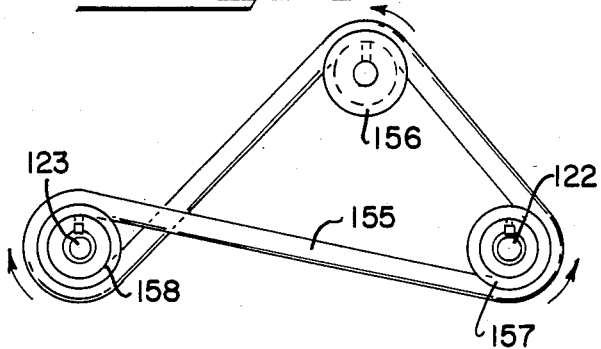
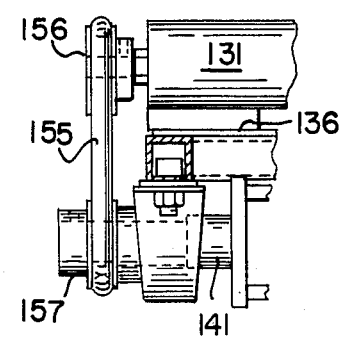
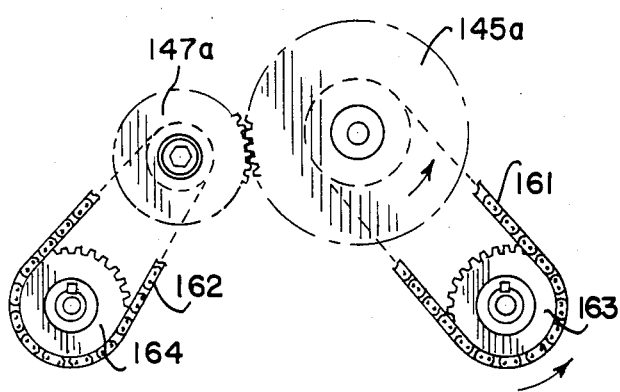
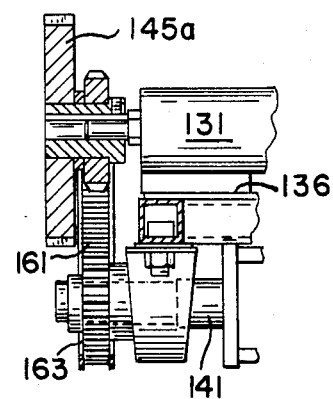

PORTABLE POLISHER

BACKGROUND AND DESCRIPTION OF THE INVENTION

This invention generally relates to polishing devices, more particularly to hand-operable or portable devices that are suitable for restoring the surface finish to substrates that have an extensive surface area. The portable polisher according to this invention includes a pair of polishing rolls that are securely mounted onto a respective pair of elongated arbors that rotate along their respective longitudinal axes in a counter-rotating manner by the operation of a drive assembly that rotates one of the arbor and buffer assemblies in a clockwise direction and the other arbor and buffer assembly in a counterclockwise direction.

In industries such as aircraft maintenance and sheet metal working, it is often necessary to improve the surface characteristics and to enhance the surface appearance of substrates such as metal sheets, particularly sheet aluminum. In this regard, the aircraft industry demands specialty aluminum sheeting for fabrication over aircraft framing to thereby construct the outer skin of aircraft. This specialty sheeting and the constructed aircraft skin should be free of blemishes and oxidation. While it is possible to paint or otherwise coat these types of surfaces, an unpainted, highly polished aluminum skin is more corrosion-resistant than a painted aluminum surface, which must also be periodically stripped and repainted, requiring toxic chemicals and expensive special facilities. Moreover, a polished aircraft skin enhances the economical operation of an aircraft because it is lighter in weight and exhibits less drag than a painted aluminum surface.

Because of these advantages, it is desirable to utilize polished aluminum sheeting to fabricate aircraft skin. However, this desirable approach does have certain disadvantages in that any blemishes thereon cannot be simply covered up, as would be the case for a painted surface. This requires high surface quality standards during the manufacture of such aluminum sheeting, as well as special care during subsequent handling thereof during shipment, storage, and skin construction. When this type of sheeting is made at the mill, it is subjected to a very high speed in-line polishing operation which imparts a highly polished surface to mill-sized webs of sheet aluminum. Such large in-line webs are very effective in imparting the needed finish to these specialty products. However, immediately after these specialty sheets are manufactured, they are susceptible to being scratched, discolored or otherwise blemished by handling and transport devices, by the environment, and by human handling, particularly during operations such as fabricating the sheeting into the aircraft skin.

Accordingly, there is a need for a means by which surface blemishes can be repaired or removed after such highly polished specialty sheets are prepared at the mill. Certain attempts have been made in this regard by providing portable polishing units which are intended to achieve spot polishing of these blemishes. Typically, such portable polishing units impart a rotary sweep to a relatively flat buffing disk which is usually spindle-mounted.

Such units have proven less than satisfactory when compared with the results attained by large in-line polishers used at a specialty mill. Units of this type do not achieve the uniform surface finish characteristic of a finish applied at the mill. They tend to leave an uneven finish within which buffing marks are visible. Additionally, these devices, although portable, can be difficult to control because of their tendency to "walk" along the surface. Furthermore, since these specialty sheetings are exceptionally thin and pure, portable polishing units, which typically do not provide the precision polishing of the in-line apparatus used at the mill, run the risk of actually removing the thin, pure aluminum surface that is characteristic of this sheeting. In addition, previously known portable polishing units often do not provide the buffer speed needed to attain mill-like characteristics, and when attempts have been made to increase such speed of rotation, the risk of burning the surface is substantially increased.

Therefore, there is a need for a portable polishing apparatus which is easily controlled by a single operator and that can impart a mill-like finish with minimal risk of damaging the surface of specialty sheeting such as highly polished aluminum.

Such is accomplished according to the present invention by providing a portable polishing apparatus having a pair of elongated rotatable buffing surfaces, each of which rotates along its longitudinal axis. Each such longitudinal axis is generally parallel to the surface being polished, and the pairs of buffers counter-rotate with respect to each other, one of the buffing surfaces rotating in the clockwise direction, another rotating in the counterclockwise direction.

Accordingly, an object of the present invention is to provide an improved portable polisher.

Another object of this invention is to provide an improved, lightweight polisher having a pair of elongated counter-rotating buffs which also may be counter-oscillating along their respective longitudinal axes, which are generally parallel to the surface being polished.

Another object of the present invention is to provide an improved portable polisher that minimizes surface scratching while operating at a surface-feet-per-minute rate and with an amount of power that is on the general order of that achieved by a mill-scale, in-line polisher in order to impart a mill-quality finish to an aluminum substrate.

Another object of the present invention is to provide an improved portable apparatus for surface repair or surface preparation of a variety of generally flat substrates.

Another object of this invention is to provide an improved portable device that restores the polished finish of aluminum aircraft skin after it has been dulled by normal use.

Another object of the present invention is to provide an improved portable device for repairing blemishes on polished aluminum sheeting that occurs during handling, transport, and fabrication.

Another object of this invention is a portable polisher that removes oxidation or other blemishes quickly and efficiently without substantial removal of thin, pure aluminum surfaces.

Another object of the present invention is to provide a means and method for automatically applying polishing compound during the operation of a polishing device having counter-rotating longitudinal buffers.

Another object of the present invention is to provide an improved portable polisher having a handle assembly that facilitates remote operation thereof.

These and other objects, features and advantages of the present invention will be clearly understood through consideration of the following description, including the accompanying drawings wherein:

FIG. 2a is a top plan view, partially in section, of the handle assembly shown in FIG. 2;

FIG. 3 is a longitudinal section through the axis of one of the arbors of another embodiment of the invention wherein the motor is mounted within the arbor and wherein each of the elongated buffers reciprocates along its axis while it rotates therealong;

FIG. 4 is a sectional view along the line 4—4 of FIG. 3;

FIG. 5 is a side elevational view, partially in section, of an alternative embodiment having its drive motor mounted externally of the arbors;

FIG. 6 is an end elevational view of the embodiment illustrated in FIG. 5;

FIG. 7 is an end elevational view of an alternative drive mechanism for an embodiment having a motor mounted externally of the arbors;

FIG. 8 is a side elevational view of the drive mechanism illustrated in FIG. 7;

FIG. 9 is an end elevational view of a further drive mechanism for an embodiment in which the motor is mounted externally of the arbors;

FIG. 10 is a side elevational view of the drive mechanism illustrated in FIG. 9;

FIG. 11 is an end view, partially broken away, of yet a further drive mechanism for an embodiment in which the motor is mounted externally of the arbors; and FIG. 12 is a side elevational view, partially in section, of the drive mechanism shown in FIG. 11.

Figure 1:
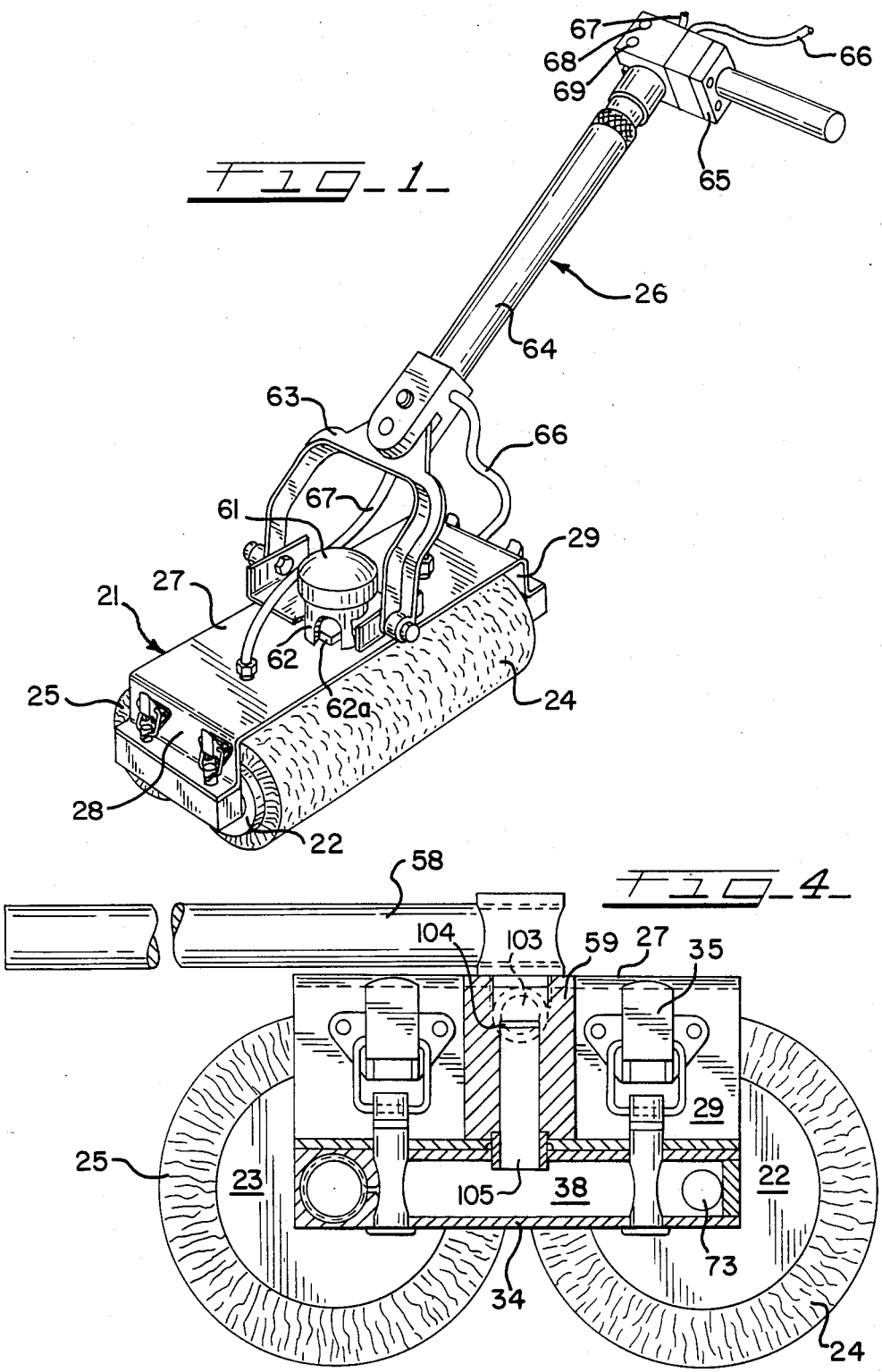
FIG. 1 is a perspective view of the portable polisher according to the present invention having one type of remote control handle assembly.

With reference to FIG. 1, the portable polisher includes a frame and cover assembly, generally designated as 21, two elongated drive arbors 22, 23 and elongated polishing rolls 24, 25, which are generally cylindrically shaped and mounted onto the elongated arbors 22, 23. An appropriate motor 31 and a drive assembly in association therewith drive the elongated drive arbors 22, 23 and the elongated polishing rolls 24, 25 mounted thereon in a counter-rotating manner with respect to each other.

Also illustrated in this embodiment is a remote handle assembly, generally designated as 26. Frame and cover assembly 21 includes an elongated panel 27 and legs, 28, 29 depending therefrom and between which are mounted the elongated drive arbors 22, 23. The frame and cover assembly 21 also may serve as a manifold for fluids such as air to power motors 31, and it is a protective guard for the operator while protruding minimally to expose a large surface area of the polishing rolls 24, 25 and permit close operation in corners and tight spots.

With more particular reference to the remote handle assembly 26, a threaded knob 61 attaches the handle assembly 26 to the frame and cover assembly 21. Control of the device is facilitated by providing flats on 62a (shaped and sized to generally mate with the inside configuration, such as the illustrated square configuration, of attachment member 62) an attachment member 62, whereby the handle assembly 26 may be securely oriented in a variety of directions, such as the orientation illustrated in FIG. 1 which is generally parallel to the longitudinal axis of the polishing rolls 24, 25, or transverse thereto, or the like. A yoke assembly 63 facilitates attachment of the remote handle assembly 26 to the frame and cover assembly 21 in a manner that provides advantageous operator control over movement of the device. Assembly 26 includes a handle shaft 64, which may include multiple extensions to provide telescoping thereof and increase the distance of remote operation by a handle member 65 containing suitable throttle control 68 and spray nozzle control 69. In the illustrated embodiment, air supply conduit 66 and polishing compound conduit 67 are routed through or onto the handle shaft 64 and the handle member 65 to appropriate remote supplies.

Figure 2:
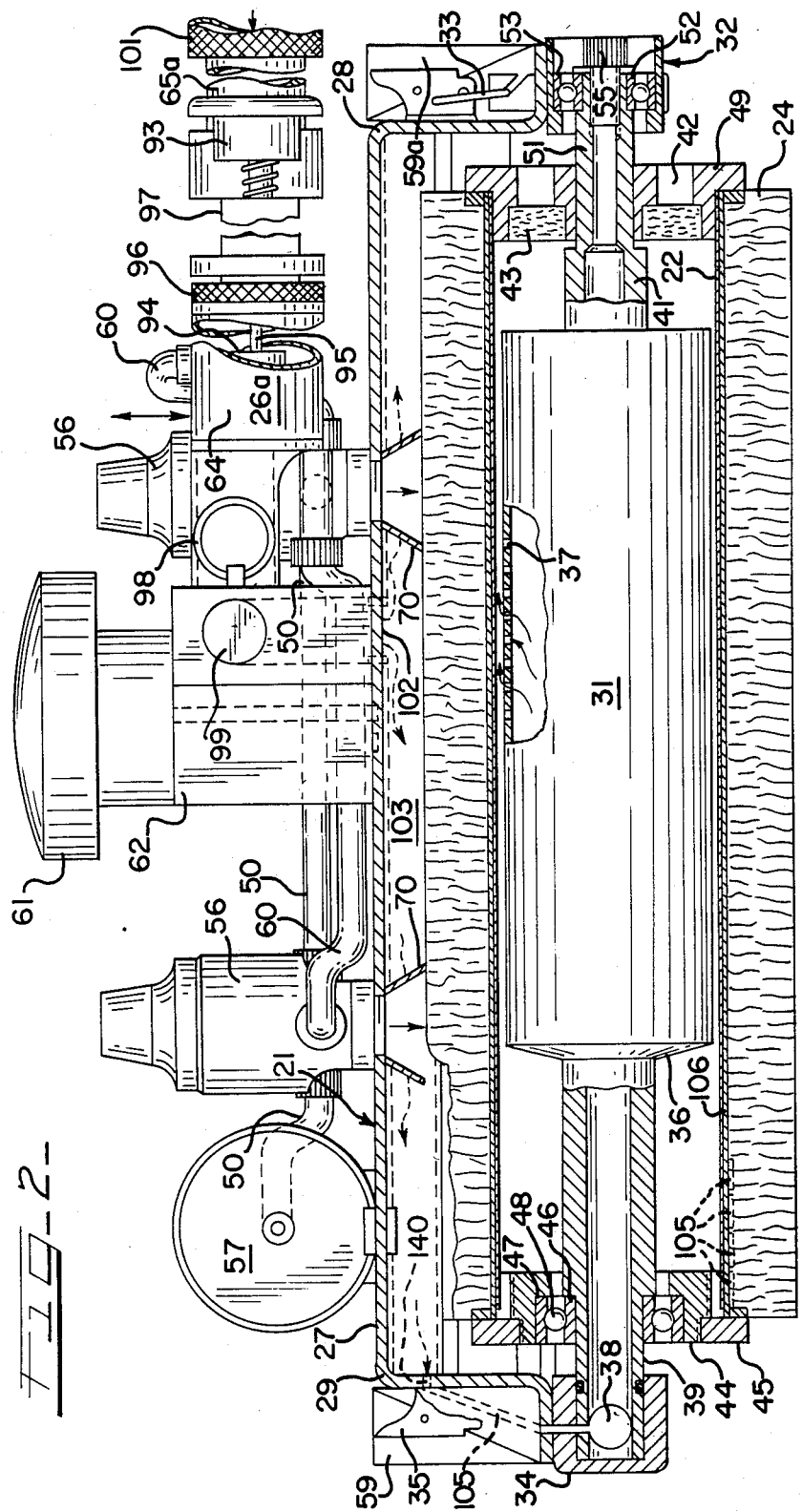
FIG. 2 is a sectional view generally through the longitudinal axis of one of the arbors of an embodiment wherein air motors are mounted within each arbor, a liquid buffing compound distribution assembly is mounted onto the device, and supply air is directed through a handle assembly and a cover manifold.

Regarding the embodiment of FIG. 2, each motor 31 is mounted within the elongated drive arbors 22, 23 respectively in a manner whereby the motors 31 are each securely mounted while the elongated drive arbors 22, 23 are rotatable along their respective longitudinal axes. Mounting of the motors 31 inside of the drive arbors 22, 23 provides simplified power transmission and reduces noise level.

Suitable mounting means are provided to affix the frame and cover assembly 21 to the motor 31. The particular mounting means illustrated in FIG. 2 includes a friction-reducing rotation assembly 32 secured to the depending leg 28 by overcenter clamps 33 and an end bar 34 that is mounted from depending leg 29 by overcenter clamps 35. When the overcenter clamps 33, 35 are released, the rotation assembly 32 and the end bar 34 separate from the frame and cover assembly 21 to thereby separate each motor 31 and both arbors 22, 23 mounted thereon from the frame and cover assembly 21. The end bar 34 can then be pulled off of a stationary motor housing 36 projecting from the motor 31 to thereby separate the drive arbors 22, 23 to facilitate changing of the polishing rolls 24, 25, which are typically disposable.

When the motor 31 is an air motor, a supply of pressurized air enters through an inlet port 38, passing through an extension 39 of the stationary motor housing 36 and into the motor 31 which drives the rotating drive shaft 41. Exhaust ports 37 provide needed air flow out of the motor 31, and exhaust outlets 42, which may include muffling material 43, complete the air flow path through the device.

One end of the elongated drive arbor 22 is rotatably mounted onto the stationary motor housing 36 by a suitable low-friction rotation assembly 44. The buffing roll 24 is secured in place by a buffing roll lock nut 45. The rotation assembly 44 illustrated includes a stationary inner race 46, a rotating outer race 47, and bearings 48.

The other end of the elongated drive arbor 22 is mounted to the rotating drive shaft 41 by a rotating collar 49. The motor 31 rotates the drive shaft 41 to thereby rotate the collar 49 and thus the elongated drive arbor 22 and the polishing roll 24 mounted thereover. This rotational drive can be facilitated by providing flat surfaces on the drive shaft 41, such as an extension 51 having a generally square cross-section. The rotating drive shaft 41 is mounted to the frame assembly 21 by means of the rotation assembly 32 which includes a suitable friction-reducing structure, such as the illustrated rotating inner race 52, stationary outer race 53, and bearings 54. The rotation assembly 32 may be secured to the drive shaft 41 by a securement member such as bolt 55.

Motor 31 drives the polishing roll 24 in one rotational direction, for example clockwise, while a similar motor (not shown) drives the polishing roll 25 in the opposite rotational direction, for example counterclockwise, to thereby provide counter-rotating polishing rolls 24 and 25. Such counter-rotation may be achieved by mounting the two motors in opposite orientations whereby the rotating drive shaft of the other motor is mounted into the end bar 34.

Frame and cover assembly 21 may include suitable spray assemblies 56 for facilitating the application of buffing compound to the polishing rollers 24 and 25. These spray assemblies 56 are in liquid-passing communication through housing 50 with supply chamber 57 for providing liquid buffing compound under pressure. Chamber 57 is affixed to the frame and cover assembly 21. A preferred supply chamber 57 is of known type wherein the buffing compound is contained within a bellows-type liner, and a pressurized gas is charged in the space between the liner and the inside walls of the supply chamber 57.

Spray assemblies 56 provide a location for atomizing the liquid buffing compound with pressurized air entering same by way of air conduit 60. Pressurized air enters air conduit 60 by depressing button 93 which opens a valve 94 within remote handle assembly 26a. The pressurized air passing through air conduit 60 enters the spray assemblies 56 and directly impinges upon liquid buffing compound entering the spray assemblies 56 through hosing 50 to thereby produce a generally fan-shaped spray through spray collars 70 and along the length of the polishing rolls 24, 25.

Regarding the handle assembly 26a, illustrated in FIGS. 2 and 2a, extensions may be added to the handle shaft 64 by extending the length of a valve pin 95 and adding an extension shaft to the handle shaft 64, which is facilitated by a suitable interlock structure (not shown). A union 96, or the like, facilitates rotation of an offset handle element 97 (the offset being generally into the sheet as shown in FIG. 2) and a handle member 65a extending therefrom. When union 96, which is of well-known construction, is rotated in a counterclockwise direction, the offset handle element 97 is loosened from and can be rotated with respect to the handle shaft 64, by which rotation of the offset handle element 97, may be generally centered with respect to the frame and cover assembly 21. Clockwise rotation of the union 96 tightens the offset handle element 97 onto the shaft 64 in order to maintain the desired orientation of the handle member 65a with respect to the handle shaft 64. A fastpin 98 holds the handle assembly 26a in the orientation shown in FIG. 2, which is generally parallel to the axes of the polishing rolls 24, 25. When the fastpin 98 is pulled outwardly, the handle assembly 26a is free to rotate along a pin 99 in a generally up-or-down direction.

A twist throttle 101 controls the flow of pressurized air through the handle assembly 26a. Such pressurized air flows through suitable passageways in the attachment member 62 and through an orifice 102 into manifold accumulator 103, which assists in maintaining equalized air pressure feed to both of the motors 31. Pressurized air within the manifold accumulator 103 flows through an orifice 104 in depending leg 29, transfer port 105 within manifold block 59, and into inlet port 38 of the end bar 34 in order to drive the motor 31. Similar passageways through the depending leg 28 and manifold block 59a provide drive air to the other counter-rotating motor.

In the embodiment illustrated in FIGS. 3 and 4, the elongated drive arbors 22, 23 and the respective polishing rolls 24, 25 secured thereto both reciprocate as well as rotate. Preferably, the polishing rolls 24, 25 while they counter-rotate, simultaneously oscillate on their respective axes of rotation.

A reciprocating motor assembly including motor 31a is mounted at one end by its rotating drive shaft 41a, being secured to the depending leg 28 by a rotation mount 32a releasably secured to the depending leg 28 by a structure such as the overcenter clamp 33, or the like. The other end of the motor 31a is mounted to the depending leg 29 by the end bar 34 which securely holds stationary housing 36a in place onto the depending leg 29 by a suitable structure such as the overcenter clamp 35. A rotating and reciprocating collar 49a is slidably mounted onto the drive shaft 41a which includes flats or the like to ensure rotation of the elongated drive arbor 22 and its polishing roll 24 as the drive shaft 41a rotates.

The reciprocating motor assembly imparts reciprocating motion to the arbor 22 by a piston assembly 71 which includes a stationary piston 72 securely mounted over extending stationary motor housing 36a. Piston assembly 71 further includes a cylinder-like piston housing 76 that is rotatably and slidably mounted onto the extending stationary motor housing 36a and that is securely mounted to the drive arbor 22.

Pressurized air enters the device through inlet port 38, in substantially the same manner as described herein in connection with FIG. 2, and into axial passageway 73 which includes a branch 74 opening into a peripheral supply groove 75. While pressurized air moves through the axial passageway 73 to drive the motor 31a, it also flows through branch 74 and into supply groove 75. The piston housing 76 includes a plurality of ports, a pair of which 78, 79 are interiorally located with respect to the stationary piston 72. Another pair of ports 81, 82 are exteriorally located with respect to the stationary piston 72. Piston housing 76 further includes an outside supply passage 83 connecting the internal port 78 with the external port 81, as well as an inside supply passage 84 for communicating the internal port 79 with the external port 82. The piston housing 76 further includes an outside exhaust port 85 and an inside exhaust port 86 which link interior chambers 88, 89 of the cylinder-like piston housing 76 with an exhaust passage 87.

During the operation of this device, with the motor 31a rotating the polishing roll 24, air is supplied into the peripheral supply groove 75, and the polishing roll 24 is moved linearly, for example to the right as illustrated in FIG. 3, whereby the supply groove 75 moves into general alignment with the internal port 79, whereupon the pressurized air enters the inside supply passage 84 for movement through the external port 82 and into the interior chamber 88, at which time the pressurized air within this interior chamber 88 imparts a pressure to an interiorally facing wall 91 of the interior chamber 88 to thereby move the piston housing 76 to the right as illustrated in FIG. 3, which likewise moves the polishing roll 24 in this direction. Such movement also moves the inside exhaust port 86 to a position generally clear of the stationary piston 72 and into communication with the interior chamber 88, whereby pressurized air within the interior chamber 88 passes through the inside exhaust port 86 and out of the piston housing 76 by way of the exhaust passage 87.

At substantially the same time that this passage through inside exhaust port 86 occurs, the supply groove 75 becomes generally aligned with the interior port 78 whereby pressurized air passes therethrough and into the interior chamber 89 by way of the outside supply passage 83 and the external port 81. This builds up air pressure within the interior chamber 89 at about the same time that the pressure is dissipated within the other interior chamber 88, with the result that the piston housing 76 and the polishing roll 24 move to the left as illustrated in FIG. 3, thereby opening the outside exhaust port 85 into the exhaust passage 87 to thereby dissipate the pressure within the interior chamber 89. Pressure within the interior chamber 89 impinges upon its externally facing wall 92 in order to effect the movement of the piston housing 76 to the left. As the air continues to flow through the branch 74, pressure continues to be alternately built up and dissipated within the inside interior chamber 88 and the outside interior chamber 89 in order to impart a reciprocating, or oscillating linear movement to the elongated drive arbor 22 and its polishing roll 24. Preferably, a similar, but oppositely oriented, arrangement is included within the elongated drive arbor 23, with the result that the polishing roll 25 reciprocates also.

Regarding FIGS. 5 and 6, these illustrate an embodiment wherein a motor 131 is mounted externally of polishing rolls 124, 125, rather than within drive arbors 122, 123. The device includes a frame and cover assembly 121 which includes a frame 128 to which is mounted a protective cover 127, shown in phantom. Each elongated drive arbor 122, 123 is secured to the frame 128 by pillow blocks or rotation and reciprocation collars or assemblies 132 and 133. Motor 131 is attached to the frame assembly 121 by a suitable stationary motor housing 136.

This device effects counter-rotation of the polishing rolls 124, 125. Collars or assemblies 132 and 133 allow rotary, and preferably also linear, movement of the elongated drive arbor 122 with respect to the frame assembly 121. In order to maintain alignment between the motor 131 and the assembly that drives the elongated drive arbor 122, a linear movement accommodating assembly or coupling 135 joins the elongated drive arbor 122 to a drive shaft 141 that is rotatably mounted to the stationary motor housing 136 by a pillow block or rotation assembly 134. Coupling 135 includes a linear bearing 137 mounted onto pins 138, 139. By this structure, the linear bearing 137 is able to move axially on the pins 138, 139 while there is no linear movement of the drive shaft 141.

When it is desired to effect counter-oscillation of the polishing rolls 124, 125, a cylindrical cam 142 is rigidly secured to each elongated drive arbor 122, 123, and a cam follower 143 is securely mounted to the frame 128. As the cam 142 rotates with the elongated drive arbor 122, the cam follower 143 moves through an eccentric slot 144 to thereby oscillate the elongated drive arbor 122 and the polishing roll 124 mounted thereon. A similar structure is included on the other elongated drive arbor 123 in order to impart axial, oscillating movement of the polishing roll 125. Counter-oscillation of the rolls 124 and 125 is achieved by orienting the eccentric slots 144 of the respective cams 142 generally opposite to each other such that cam 142 on drive arbor 122 is fully extended (to the right in FIG. 5) when the cam 142 on drive arbor 123 is fully retracted (to the left in FIG. 5), and vice versa.

Referring to the drive assembly illustrated in FIGS. 5 and 6, such includes a gear assembly. The gear assembly includes a drive gear 145 secured to the shaft of the motor 131 which directly drives a driven gear 146 in a direction opposite to that of the drive gear 145. The drive gear 145 simultaneously rotates an intermediate gear 147 which in turn drives another driven gear 148 in the same direction as the drive gear 145 in order to achieve counter-rotation of the drive arbors and their polishing rolls 124, 125.

The drive means illustrated in FIGS. 7 and 8 includes a pair of belts 151, 152 driven by a double drive sheave 153, which is in turn driven by the motor 131. Belt 151 drives a driven sheave 154 for driving the rotating drive shaft 141 and the elongated drive arbor 122 with its polishing roll in the same direction as the double drive sheave 153. Elongated drive arbor 123 rotates in a direction opposite to that of the double drive sheave 153, which is accomplished by crossing the belt 152 over itself.

FIGS. 9 and 10 show an embodiment similar to that of FIGS. 7 and 8, except a single belt 155 is utilized, which belt 155 is once crossed on itself such that a single drive sheave 156 rotates in the same direction as driven sheave 157 and in the opposite direction of driven sheave 158.

The embodiment of FIGS. 11 and 12 is somewhat similar to that of FIGS. 5 and 6, except a chain drive is utilized that includes a gear chain 161 for driving a driven gear 163 in the same direction as drive gear 145a, as well as a drive chain 162 for driving a driven gear 164 in the direction opposite to that of the drive gear 145a, which is accomplished by an intermediate gear 147a.

Regarding the polishing rolls 24, 25, these are preferably predressed and disposable. Typically such polishing rolls 24, 25 consist of a plurality of rotary buffing wheels 107 (FIG. 2) that are assembled, such as by an adhesive, in end-to-end relationship with each other onto a disposable elongated cylinder 106. Then the plurality of adjacent wheels 107 are dressed as needed to provide a generally uniform polishing surface and complete the manufacture of the polishing rolls 24, 25. Such rolls 24, 25 are inserted over the elongated drive arbors 22, 23 by sliding the elongated cylinder 106 thereover. Alternatively, buffing material or bristles may be otherwise wrapped, such as by spiral wrapping, over the elongated cylinder 106.

It will be understood that the embodiments of the present invention which have been described are merely illustrative of a few of the applications of the principals of the present invention. Numerous modifications may be made by those skilled in the art without departing from the true spirit and scope of the invention.

What is claimed is:
1. A portable polishing apparatus for surface preparation of substrates comprising:
    a frame assembly having handle means mounted thereonto for operator grasping and controlling of the apparatus;
    two elongated drive arbors depending from and rotatably mounted with respect to said frame assembly, each said elongated drive arbor having a peripheral surface and an elongated longitudinal axis, each said elongated longitudinal axis being generally parallel to the surface of the substrate being prepared by the apparatus;

an elongated polishing roll securely mounted over the peripheral surface of each of said elongated drive arbors;

motor means for imparting rotational movement, said motor means being in operative interengagement with each of said elongated drive arbors;

drive means operatively engaging said motor means and said elongated drive arbors for transmitting rotational movement from said motor means to one of the elongated drive arbors and its polishing roll in a clockwise direction and to the other of said elongated drive arbors and its polishing roll in a counterclockwise direction, whereby said polishing rolls counter-rotate with respect to each other; and said elongated polishing roll includes an elongated, disposable cylinder having an internal diameter greater than the external diameter of the drive arbors, and a supply of buffing material including a plurality of rotary buffing wheels assembled onto said elongated, disposable cylinder, said buffing wheels being positioned adjacent to each other in an end-to-end orientation assembled onto said elongated, disposable cylinder.

2. The portable polishing apparatus of claim 1, wherein each of said elongated polishing rolls is generally coaxial with its elongated drive arbor.

3. The portable polishing apparatus of claim 1, wherein each of said elongated polishing rolls is generally cylindrically shaped.

4. The portable polishing apparatus of claim 1, wherein said frame assembly includes a cover member to which said handle means is mounted.

5. The portable polishing apparatus of claim 1, wherein said motor means includes a motor mounted within said rotatably mounted elongated drive arbor.

6. The portable polishing apparatus of claim 1, wherein said motor means includes a motor mounted within said rotatably mounted elongated drive arbor, and wherein said motor has a longitudinal axis that is generally coextensive with the longitudinal axis of the elongated drive arbor.

7. The portable polishing apparatus of claim 1, wherein said drive means is rotatably mounted to said frame assembly generally along each said longitudinal axis of the respective elongated drive arbors.

8. The portable polishing apparatus of claim 1, wherein said motor means is an air-driven motor.

9. The portable polishing apparatus of claim 1, further including spray nozzles affixed to the frame assembly, said spray nozzles being in fluid-passing communication with a supply of buffing compound for applying the buffing compound to said elongated polishing rolls.

10. The portable polishing apparatus of claim 1, wherein said handle means is a remote handle assembly including a yoke assembly, an elongated handle shaft, and a remote handle having a throttle control.

11. The portable polishing apparatus of claim 1, said supply of buffing material having been predressed to modify the surface characteristics of said supply of buffing material.

12. A portable polishing apparatus for surface preparation of substrates comprising:

a frame assembly having handle means mounted thereonto for operator grasping and controlling of the apparatus;

two elongated drive arbors depending from and rotatably mounted with respect to said frame assembly, each said elongated drive arbor having a peripheral surface and an elongated longitudinal axis, each said elongated longitudinal axis being generally parallel to the surface of the substrate being prepared by the apparatus;

an elongated polishing roll securely mounted over the peripheral surface of each of said elongated drive arbors;

motor means for imparting rotational movement, said motor means being in operative interengagement with each of said elongated drive arbors;

drive means operatively engaging said motor means and said elongated drive arbors for transmitting rotational movement from said motor means to one of the elongated drive arbors and its polishing roll in a clockwise direction and to the other of said elongated drive arbors and its polishing roll in a counterclockwise direction, whereby said polishing rolls counter-rotate with respect to each other; and a buffing compound applicator assembly for applying buffing compound to said elongated polishing rolls, said applicator assembly including a supply chamber mounted onto said frame assembly, a spray assembly having a spray orientation toward said elongated polishing rolls, a conduit member joining the supply chamber to the spray assembly, and means for supplying pressurized air to said spray assembly to thereby atomize buffing compound entering said spray assembly from said supply chamber.

13. A portable polishing apparatus for surface preparation of substrates comprising:

a frame assembly having handle means mounted thereonto for operator grasping and controlling of the apparatus, said handle means including an elongated handle shaft that is rotatably mounted to said frame assembly by mounting means for providing alternative positioning of the handle shaft along a first axis that is generally transverse to axes of elongated polishing rolls and along a second axis that is generally transverse to its said first axis;

two elongated drive arbors depending from and rotatably mounted with respect to said frame assembly, each said elongated drive arbor having a peripheral surface and an elongated longitudinal axis, each said elongated longitudinal axis being generally parallel to the surface of the substrate being prepared by the apparatus;

each elongated polishing roll being securely mounted over the peripheral surface of each of said elongated drive arbors;

motor means for imparting rotational movement, said motor means being in operative interengagement with each of said elongated drive arbors; and drive means operatively engaging said motor means and said elongated drive arbors for transmitting rotational movement from said motor means to one of the elongated drive arbors and its polishing roll in a clockwise direction and to the other of said elongated drive arbors and its polishing roll in a counterclockwise direction, whereby said polishing rolls counter-rotate with respect to each other.

14. A portable polishing apparatus for surface preparation of substrates comprising:
- a frame assembly having handle means mounted thereonto for operator grasping and controlling of the apparatus;
- two elongated drive arbors depending from and rotatably mounted with respect to said frame assembly, each said elongated drive arbor having a peripheral surface and an elongated longitudinal axis, each said elongated longitudinal axis being generally parallel to the surface of the substrate being prepared by the apparatus;
- an elongated polishing roll securely mounted over the peripheral surface of each of said elongated drive arbors;
- motor means for imparting rotational movement, said motor means being in operative interengagement with each of said elongated drive arbors;
- drive means operatively engaging said motor means and said elongated drive arbors for transmitting rotational movement from said motor means to one of the elongated drive arbors and its polishing rolls in a clockwise direction and to the other of said elongated drive arbors and its polishing roll in a counterclockwise direction, whereby said polishing rolls counter-rotate with respect to each other; and
- said motor is an air motor mounted within said rotatably mounted elongated drive arbor, and said drive means includes passageways having pressurized air flowing therethrough, said passageways including an accumulator manifold upstream of said motor means.

* * * * *

UNITED STATES PATENT AND TRADEMARK OFFICE
CERTIFICATE OF CORRECTION

PATENT NO. : 4,499,624

DATED : Feb. 19, 1985

INVENTOR(S) : James A. Bloome, Rick A. Meeker, Jerry T. Whicker and Frederick J. Foreman It is certified that error appears in the above-identified patent and that said Letters Patent are hereby corrected as shown below:

Column 3, line 66, delete "on" after "flats".

Column 4, line 1, insert --on-- after "62)".

Column 5, line 49, insert --the handle member 65a-- after "97,".

Signed and Sealed this

Eighteenth Day of February 1986

[SEAL]

Attest:

DONALD J. QUIGG

Attesting Officer

Commissioner of Patents and Trademarks